April 11, 1967 A. VERIVE 3,314,068
GRADING METHOD AND APPARATUS
Filed March 30, 1964 3 Sheets-Sheet 1
FIG. 1
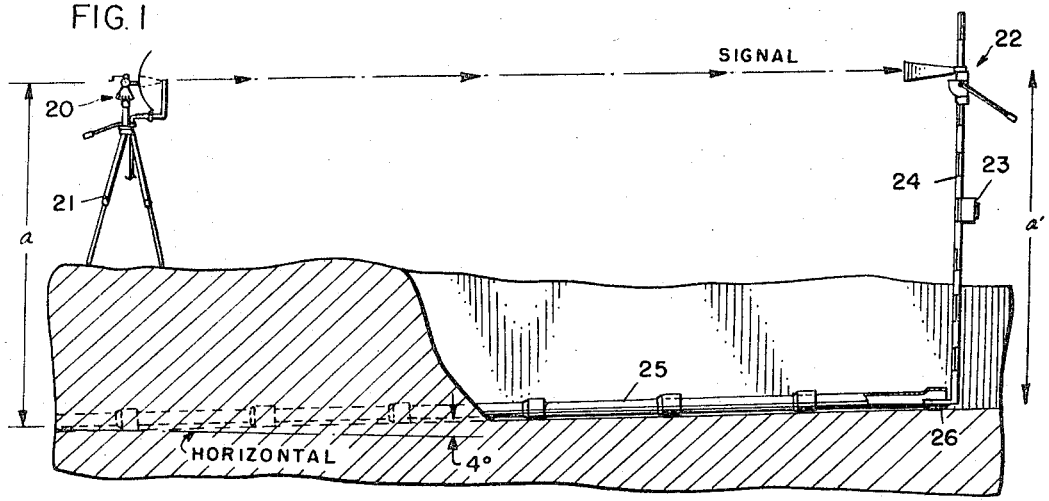
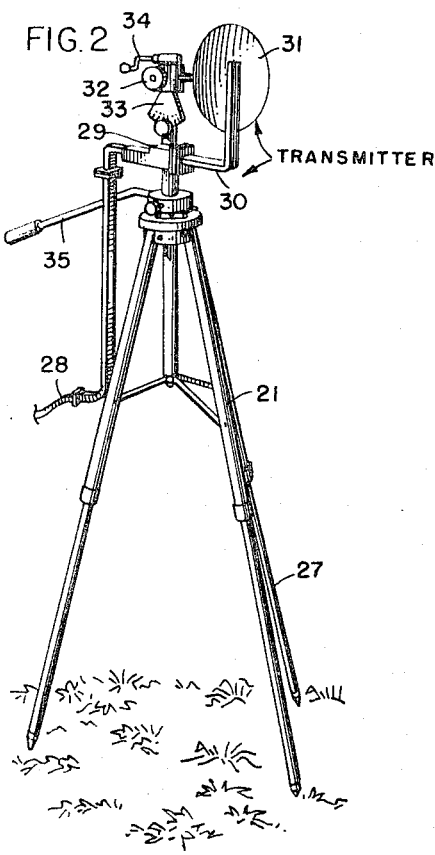
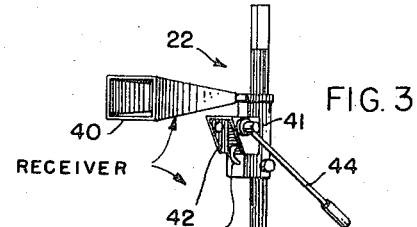
INVENTOR:
ALPHONSE VERIVE
BY
Margace Johnston Cooke & Root
ATT'YS April 11, 1967    A. VERIVE    3,314,068
GRADING METHOD AND APPARATUS
Filed March 30, 1964    3 Sheets-Sheet 2

INVENTOR:
ALPHONSE VERIVE
BY
ATT'YS

April 11, 1967     A. VERIVE     3,314,068
GRADING METHOD AND APPARATUS
Filed March 30, 1964     3 Sheets-Sheet 3

INVENTOR:
ALPHONSE VERIVE
BY
ATT'YS 3,314,068
GRADING METHOD AND APPARATUS
Alphonse Verive, West Chicago, Ill., assignor of twenty-five percent to Frank J. Catalani, twenty-five percent to Anthony V. Pasquale and twenty-five percent to Alton D. Anderson
Filed Mar. 30, 1964, Ser. No. 355,679
10 Claims. (Cl. 343—107)

The present invention relates to a method for making grade determinations and to apparatus for carrying out this method. More particularly, the subject invention is directed to an improved method and means for establishing a road grade or a curb grade, for laying pipe, for use in general excavating, and for other applications requiring a fixed slope or a level site.

The methods that are currently employed in grading roads, pipelines, foundations, and the like, are not entirely satisfactory. In laying sewer pipe, for example, a slow and somewhat complicated system is followed in setting the grade. Customarily, a survey is made and manholes are marked off every 350 to 400 feet. Batterboards are then set up between the manholes at about 50 foot intervals. A chalk line is strung across the batterboards in order to establish a line of reference. A gauge pole having a protruding end is placed in the bed and is rested on the flow line of the pipe. The distance between the flow line and the chalk line is determined to fix the grade. This method requires the use of a crew including at least a pipe setter and the operator of the gauge pole. Computations that are made by the pipe setter depend upon information given to him by the gauge pole operator. If the information is misunderstood by the pipe setter a significant error results. Such calculations are made so frequently that mistakes often occur over a given sewer bed distance. A variation of as little as one-half inch in the grade of the bed will adversely affect the operation of the sewer system and, therefore, constant checking and rechecking is required. It is readily apparent that the system is inefficient.

Prior art attempts to improve on the batterboard-chalk line method of fixing grades through the use of various devices have not proven to be entirely satisfactory. In one suggested process a light projector is positioned within a manhole. The light is sent through the pipe sections at an angle that is determined by the use of a transit and prism located above the manhole. An operator using a device that fits over the end of the pipe sets the grade by reference to the position at which the light strikes a target incorporated in the device. While such methods have advantages over the batterboard-chalk line system, they either are inconvenient to carry out or are not sufficiently accurate to provide fully satisfactory results.

In fields other than pipe setting there is also a substantial need for new processes and equipment which will lessen the difficulties involved in grading operations. In setting curbs, in grading railroad beds or roadbeds, in general excavating, etc., there is a real need for a device and process which will enable a contractor or engineer to make grade determinations in a rapid and inexpensive manner.

It is the principal object of the present invention, therefore, to provide a method for making grade determinations in a highly efficient manner and which will substantially lower the cost of carrying out such operations.

Another object of the invention is to provide a method and apparatus which can be used in carrying out a wide variety of grade setting operations.

Still another object of the invention is to provide a process and apparatus for making grade determinations which does not require the use of a large work crew.

Another object is to provide a process and apparatus for laying sewer pipe by which the proper grade for the pipe can be determined in a rapid and uncomplicated manner.

Other objects will become apparent to those skilled in the art from the following detailed description of the invention. The invention can best be understood by reference to the attached drawing in which:

FIG. 1 is a side elevational view illustrating the use of the subject process in laying sewer pipe;

FIG. 2 is a perspective view showing a transmitting antenna and related equipment which can be used in carrying out the subject process;

FIG. 3 is a perspective view showing a receiving device, gauge pole, and meter which can be employed in carrying out the process;

Figure 4:
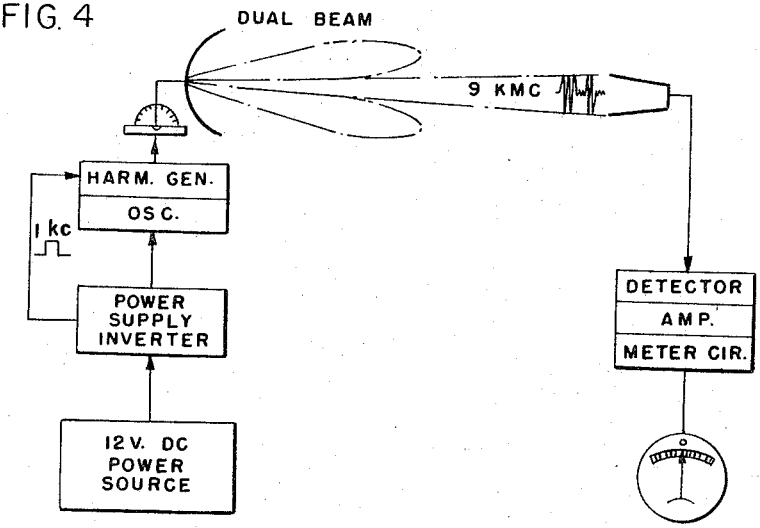
FIG. 4 is a block diagram illustrating the operation of the grade setting device.

FIG. 1 is a side elevational view illustrating the use of the subject process in setting sewer pipe. In carrying out the process a survey would be made to establish the line beneath which the pipe will be laid. Manholes are then marked off along the line each 350 to 450 feet. A conventional digging machine can be used to form a trench at approximately the desired depth. As is shown in FIG. 1, transmitting antenna or signal producing device 20 is adjustably mounted on tripod 21 behind or above the starting point of the trench. The signal is transmitted at a predetermined angle from the horizontal. This angle is equal to the grade that is desired in the sewer line. The signal will always be parallel to the pipe sections. Receiving device or antenna 22 receives the signal emitted from transmitter 20 and passes that signal by means to be described below to meter 23 which converts the signal to a meaningful reading. Both the receiving device 22 and meter 23 are mounted on gauge pole 24. As each section 25 of pipe is set in place, protruding end 26 of gauge pole 24 is placed in the pipe. The protruding end rests on the flow line of the pipe. A pipe setter standing in the ditch and behind gauge pole 24 reads the signal recorded on meter 23 and received by receiving device 22. The pipe setter is able to determine from meter 23 whether the pipe is too high, too low, or is at the proper level. Adjustments can then be made quickly either by removing dirt or by packing additional dirt, stone, etc., beneath the section of pipe. It has been found most convenient to affix meter 23 to gauge pole 24 at a height of about 4½ to 5½ feet. In this way the meter will be at the eye level of the pipe setter.

The width of the trench, the diameter of the pipe and the length of the pipe sections, of course, will vary in accordance with the needs of the particular job. By following the subject method it is possible to produce a grade that is exactly in accordance with the requirements of a contractor or engineer in a simple and convenient manner.

The radiant energy signal emitted from transmitting antenna 20 can be either radio waves or light waves. In a preferred embodiment of the invention the signal is in the form of high frequency micro waves.

FIG. 2 is a perspective view showing a transmitting antenna or device that can be used in carrying out the subject process. In this figure, transmitting antenna 20 is shown mounted on tripod 21. The antenna can be raised or lowered by adjusting the length of legs 27 of tripod 21. In the embodiment shown in FIG. 2, transmitting antenna includes power line 28, harmonic generator 29, wave guide 30, and parabolic reflector or dish 31. Wave guide 30 is a hollow pipe, commonly called plumbing, which is used as a transmission line for the propagation of high frequency waves. As will be explained more fully in connection with subsequent figures, a dual high frequency beam is emitted from the antenna. The parabolic reflector is capable of reflecting a parallel beam when a radiated wave source is placed at its focus. The angle at which the parallel beam is transmitted is fixed by leveling and calibrating means 32. A glass tube nearly filled with a liquid such as alcohol or ether and enclosing a movable bubble can be used to establish a horizontal line. The degree of deviation from horizontal can be fixed by reference to scale 33. Crank 34 is used to change the angle of parabolic reflector 31. The assembly is turned in a horizontal plane by means of handle 35.

FIG. 3 is a perspective view of a receiving antenna and related equipment which can be used in the subject process. In this figure, receiving antenna 22 is shown as including energy transferring device or horn 40, mounting bracket 41, detector and amplifier unit 42, transmission line 43 which preferably is mounted within gauge pole 24, and meter 23. Handle 44 is used to raise and lower receiving antenna 22. The receiving antenna and the meter are mounted on gauge pole 24. The protruding end 26 of gauge pole 24 rests on flow line 45 of pipe section 25.

FIG. 4 is a block diagram illustrating one entire embodiment of the subject invention. In this embodiment, the signal constitutes a dual beam having a carrier frequency of 9 kmc. on which is superimposed a pulse signal such as 1 kc. It is to be understood that other carrier frequencies could be used such as 8–36 kmc. As will be described more fully below, the two beams are 180° out of phase which causes a null area to be formed between the beams. In the unit described in FIG. 4, the power source is a 12 volt D.C. battery. Other sources of power, of course, can also be used. A current is passed from the power source to a power supply inverter. The inverter produces a D.C. current such as 230–300 volts which is used as the plate supply of a 1.5 kmc. oscillator cavity. The inverter also produces a 1 kc. square wave which is used as the detected signal. The oscillator cavity generates a signal having a frequency of 1.5 kmc. This signal passes to a terminal of a harmonic generator (varactor multiplier). Multiple harmonics are produced in the varactor by the terminal connected to the 1.5 kmc. oscillator source. As will be explained below, it has been found that selecting six as a multiple produces a satisfactory carrier signal. In this case the output carrier frequency is 9 kmc. The varactor is lifted above the D.C. ground so that it can be modulated with the 1 kc. signal available from the inverter. The output frequency from the harmonic generator or varactor is a 9 kmc. carrier modulated at a 1 kc. rate. The receiver is tuned to 9 kmc. The modulated carrier signal is passed through a detector which demodulates the signal. The 1 kc. signal is then fed to an amplifier and a metering circuit where it is converted into an intelligible signal.

Figure 5:
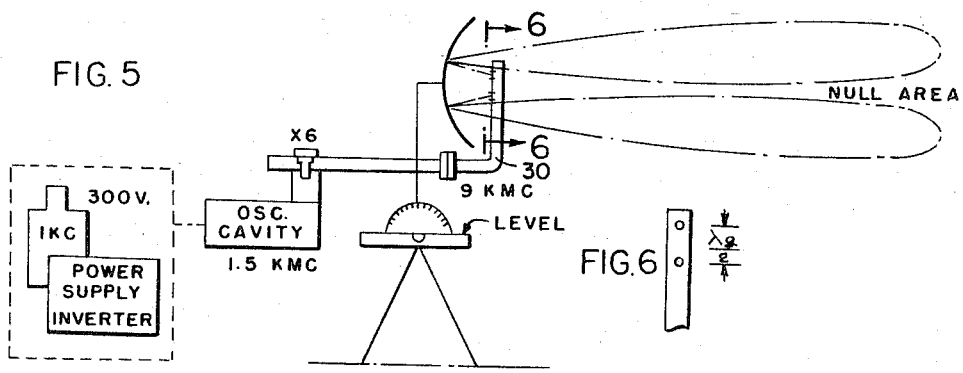
FIG. 5 is a block diagram showing a suitable circuit for the transmitter.

FIG. 5 is a block diagram of a transmitter circuit that can be used in carrying out the subject process. As was explained above, the power source for the power supply inverter can be a 12 volt D.C. battery. The power supply inverter produces a D.C. plate current which is supplied to the oscillator. A 1 kc. square wave audible signal is also produced by the power supply inverter. The harmonic generator or varactor multiplier multiplies the carrier frequency produced in the oscillator cavity by six times to produce a carrier frequency of 9 kmc. The 1 kc. signal is superimposed on the 9 kmc. carrier signal. A dual high frequency beam is emitted from the transmission line or wave guide 30 and is focused on the parabolic reflector. The angle at which the signal is broadcast is determined by the position of the reflector. The calibrating means for determining the proper setting for the reflector is schematically shown in this figure. If an all solid state transmitter is employed a power supply inverter and an oscillator, of course, would not be needed.

Figure 6:
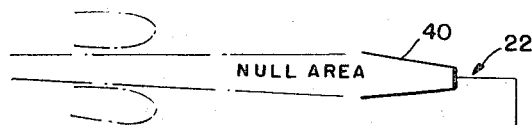
FIG. 6 is a fragmentary view taken along line 6—6 of FIG. 5.

FIG. 6 is a fragmentary view taken along line 6—6 of FIG. 5 One means by which it is possible to produce a satisfactory dual beam is illustrated in this figure. Two holes in the wave guide are spaced a half wave length apart so that one beam will be 180° off-phase as compared to the other beam. The objective is to obtain maximum coupling. Slots can be used in place of the holes as will be described more fully in connection with FIG. 10, and other means well known in the art can also be used to produce the dual beam.

Figure 7:
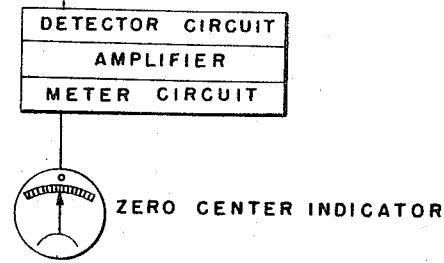
FIG. 7 is a block diagram or schematic view of a signal receiving device and position indicator.

FIG. 7 is a block diagram of a receiver circuit that can be used in carrying out the subject process. Receiver 22 is tuned to the 1 kc. signal. By raising and lowering horn 40 it is possible to determine the null or zero signal area between the dual beams. The signal is passed through the receiver to a detector circuit which demodulates the signal and frees the 1 kc. signal. The signal is then passed through an amplifier circuit and to a meter circuit. The signal coming from the meter circuit can be read on an indicator such as the zero center indicator shown in this figure.

Figure 8:
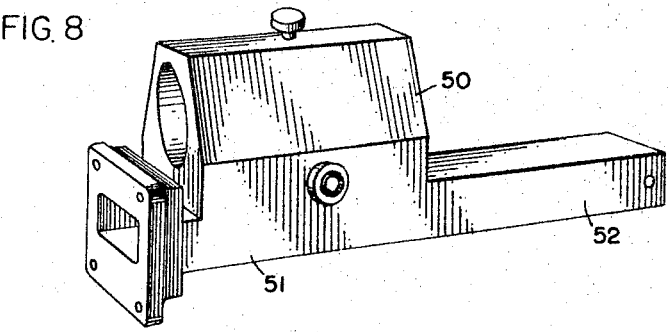
FIG. 8 is a perspective view of a transmitting device that can be used in carrying out the subject process.

FIG. 8 is a perspective view of a transmitting device that can be used in carrying out the process. The transmitting device includes harmonic generator generally 51 which includes oscillator cavity 50 and wave guide 52. Arranging the parts of the transmitter as illustrated in this figure provides a compact unit that can conveniently be used in field operations.

Figure 9:
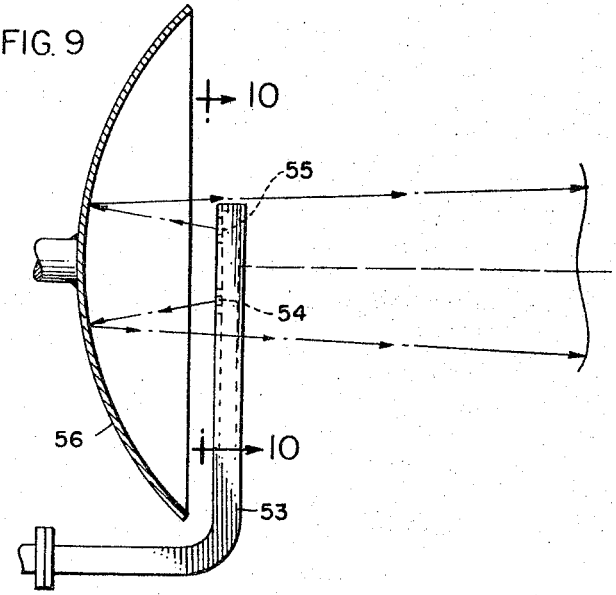
FIG. 9 is a sectional view of a parabolic reflector and a wave guide which are suitable for use in the subject process.

FIG. 9 is a sectional view showing a parabolic reflector and a transmission line that are suitable for use in the subject process. In this view, the transmission line or wave guide is shown as including curved portion 53 and apertures 54 and 55. The dual beam is produced by means of the spaced apertures. The beam is focused on parabolic reflector 56 which is set so as to produce a signal traveling at a suitable angle.

Figure 10:
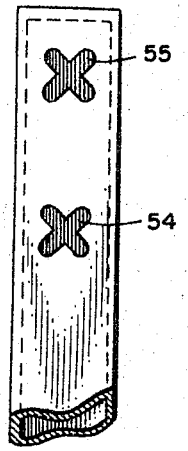
FIG. 10 is a fragmentary view taken along line 10—10 of FIG. 9.

FIG. 10 is a fragmentary view taken along line 10—10 of FIG. 9. This figure illustrates one type of aperture that can be used to produce a dual beam. The apertures are spaced so that the two beams will be out of phase. If the proper space is maintained between the apertures the two beams will be 180° out of phase. The use of slots of this type is a preferred embodiment of the invention in that circular polarization of the dual beam is obtained. Circular polarization eliminates errors that could be caused by reflection from the ground or other obstacles. In this case, the signal would have a circular polarized wave and the receiver horn would be set to receive only vertically polarized waves and not waves which might be reflected from obstacles.

Figure 11:
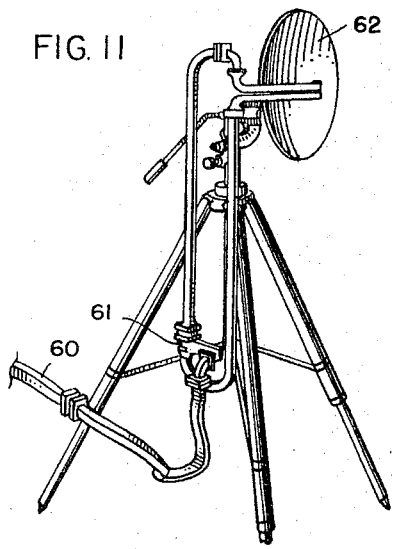
FIG. 11 is a perspective view of a transmitter which can be employed in the subject process.

FIG. 11 is a perspective view of another transmitting unit which can be employed in the process. A suitable signal having a carrier frequency and having an audible frequency signal superimposed on the carrier frequency is passed from line 60 through power splitter 61. The power splitter produces a dual beam which is passed to dish 62 from which it is reflected to the receiving unit.

In FIGS. 2 to 11 described above, the subject process was illustrated in connection with a radio or radar type signal. The process was also described in connection with the setting of sewer pipe. It should be realized, however, that other wave energies such as a concentrated light beam could be used in the process, and that the process could be used for other purposes. It is fully within the scope of the invention to use this process wherever it is desired to establish a fixed grade as in road building, general excavating, and the like.

In general, the three types of wave energy that will be used in the process include a split beam modulated ultrasonic wave; a split radio beam; and a concentrated light source such as a laser light beam. The signal must be capable of indicating heights within narrow ranges. The receiver that is used in the process, of course, will be one that is compatible with the particular transmitter that is being employed. Where a split beam micro wave signal is used such as that illustrated in the drawings, the device will have a range of up to 500 feet or more. The device is capable of making precise depth determinations to within accepted tolerances. In a preferred embodiment of the unit the indicator box or meter includes a dial that reads zero when the null signal is being received and moves either left or right on the dial when the bed is too high or too low. The dial can be calibrated so that the operator can determine at a glance how much too high or how much too low the bed may be at any given moment.

Obviously many modifications and variations of the invention as hereinbefore set forth may be made without departing from the spirit and scope thereof, and therefore only such limitations should be imposed as are indicated in the appended claims.

I claim:

1. Apparatus for making grade determinations which comprises in combination: dual beam signal transmitting means; mounting means for said signal transmitting means, said mounting means including angle determining means for fixing the angle at which said signal is transmitted; receiving means for receiving the dual beam signal emitted by said transmitting means; elongated support means for said receiving means; height adjusting means for adjusting the position of said receiving means on said support means; and signal interpreting means mounted on said elongated support means.

2. Apparatus for making grade determinations which comprises in combination: signal transmitting means, said signal transmitting means including power supply means and wave guide means for transmitting a dual beam micro wave signal having a null area between beams; mounting means for said signal transmitting means, said mounting means including angle setting means for fixing the angle at which said dual beam is transmitted; receiving means for receiving said dual beam and for determining the null area between said dual beams; elongated support means for receiving means; height adjusting means for said signal receiving means; and signal interpreting means mounted on said elongated support means.

3. Apparatus for making grade determinations which comprises in combination: signal transmitting means, said signal transmitting means including power supply means and wave guide means for transmitting a dual beam micro wave signal having a null area between beams; mounting means for said signal transmitting means, said mounting means including a tripod and angle setting means for fixing the angle at which said dual beam is transmitted; receiving means for receiving said dual beam and for determining the null area between said dual beams; elongated support means for said receiving means; height adjusting means for raising and lowering said signal receiving means on said elongated support means; and signal interpreting means mounted on said elongated support means.

4. Apparatus for making grade determinations which comprises in combination: signal transmitting means, said signal transmitting means including power supply means and wave guide means for transmitting a dual beam micro wave signal having a null area between beams; mounting means for said signal transmitting means, said mounting means including a tripod and angle setting means for fixing the angle at which said dual beam is transmitted; receiving means for receiving said dual beam and for determining the null area between said dual beams; support means for said receiving means, said support means including an elongated tubular rod, said tubular rod terminating in a right angle base section; height adjusting means for raising and lowering said signal receiving means on said support means; and signal interpreting means mounted on said elongated support means, said signal interpreting means including a zero reading meter, said meter being calibrated so that the distance between the current grade and the desired grade can immediately be determined.

5. Apparatus for making grade determinations which comprises in combination: signal transmitting means, said signal transmitting means including power supply means and wave guide means for transmitting a dual beam micro wave signal having a null area between beams, said wave guide means including means producing a circular polarized wave signal; mounting means for said signal transmitting means, said mounting means including angle setting means for fixing the angle at which said dual beam is transmitted; receiving means for receiving said dual beam and for determining the null area between said dual beams, said receiving means including means for receiving only vertically polarized waves; elongated support means for receiving means; height adjusting means for said signal receiving means; and signal interpreting means mounted on said elongated support means.

6. A method for making grade determinations which comprises: transmitting a signal above the ground at a predetermnied angle, said angle being fixed so that the desired grade will parallel said signal; intercepting said signal at periodic intervals along the area being graded with receiving means movably mounted on elongated gauge means; moving said receiving means upwardly or downwardly on said gauge means until the height of the signal is determined and measuring the distance between said signal and the grade level to fix grade.

7. A method for making grade determinations which comprises: transmitting a dual beam signal having a null area above the ground at a predetermnied angle; said angle being fixed so that a desired grade will parallel said dual beam signal; intercepting said signal wherever a check of the grade is desired with receiving means movably mounted on a gauge pole, said receiving means being capable of determining the null area between said dual beams; moving said receiving means upwardly or downwardly on said pole until the null area is found and measuring the distance betwen said null area and the grade level to fix said grade.

8. A method for making grade determinations which comprises: transmitting a dual circular polarized micro wave signal having a null area above the ground at a predetermined angle; said angle being fixed so that a desired grade will parallel said dual circular polarized micro wave signal; intercepting said signal wherever a check of the grade is desired with receiving means capable of determining the null area between said dual circular polarized micro wave signal; and measuring the distance between said null area and the grade level to fix said grade.

9. A method for making grade determinations in laying sewer pipe which comprises: transmitting a dual beam signal from a position immediately above the desired pipe bed, said signal being angled so that it will parallel the desired grade of the sewer pipe; laying said pipe section by section, as each section is laid measuring the distance between said signal and said pipe by means of a signal receiving unit mounted on an elongated gauge pole, said gauge pole having a right angle protruding base section, said right angle protruding base section being placed on the flow line of each section of pipe; and adjusting the height of the pipe section by reading a meter on said elongated gauge pole and associated with the receiving means mounted on said gauge pole.

10. A method for making grade determinations in laying sewer pipe which comprises: transmitting a dual circular polarized micro wave signal from a position immediately above the desired pipe bed, said signal being angle so that it will parallel the desired grade of the sewer pipe; laying said pipe section by section, as each section is laid measuring the distance between said signal and said pipe by means of a signal receiving unit mounted on an elongated gauge pole, said signal receiving unit being capable of receiving only vertically polarized waves, said gauge pole having a right angle protruding base section, said right angle protruding base section being placed on the flow line of each section of pipe; and adjusting the height of the pipe section by reading a meter on said elongated gauge pole and associated with the receiving means mounted on said gauge pole.

References Cited by the Examiner
UNITED STATES PATENTS

| | | | |
|---|---|---|---|
| 1,922,791 | 8/1933 | Bumpus. | |
| 2,108,867 | 2/1938 | Mathieu | 343—108 X |
| 2,489,615 | 11/1949 | Brittain | 343—108 |
| 2,502,394 | 3/1950 | Smith | 343—100 |
| 3,000,121 | 9/1961 | Martin et al. | 250—233 X |
| 3,116,557 | 1/1964 | Trice | 33—46 |
| 3,242,340 | 3/1966 | Layne. | |

CHESTER L. JUSTUS, Primary Examiner.

R. E. BERGER, Assistant Examiner.